United States Patent
McCormack et al.

(10) Patent No.: US 9,832,288 B2
(45) Date of Patent: *Nov. 28, 2017

(54) EXTREMELY HIGH FREQUENCY CONVERTER

(71) Applicant: Keyssa, Inc., Campbell, CA (US)

(72) Inventors: Gary D. McCormack, Tigard, OR (US); Roger Isaac, San Jose, CA (US); Eric Almgren, Portola Valley, CA (US)

(73) Assignee: KEYSSA, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/225,814

(22) Filed: Aug. 1, 2016

(65) Prior Publication Data

US 2016/0344851 A1 Nov. 24, 2016

Related U.S. Application Data

(63) Continuation of application No. 14/280,508, filed on May 16, 2014, now Pat. No. 9,407,731.
(Continued)

(51) Int. Cl.
*H04L 29/06* (2006.01)
*H04B 1/00* (2006.01)

(52) U.S. Cl.
CPC .......... *H04L 69/08* (2013.01); *H04B 1/0096* (2013.01)

(58) Field of Classification Search
CPC .............................. H04B 1/0096; H04L 69/08
See application file for complete search history.

(56) References Cited

U.S. PATENT DOCUMENTS

| | | |
|---|---|---|
| 5,428,836 A | 6/1995 | Sanecki |
| 6,072,433 A | 6/2000 | Young et al. |

(Continued)

FOREIGN PATENT DOCUMENTS

| | | |
|---|---|---|
| CN | 101088267 A | 12/2007 |
| CN | 101515813 A | 8/2009 |

(Continued)

OTHER PUBLICATIONS

Future Technology Devices International Ltd., "Technical Note TN.sub.—113 Simplified Description of USB Device Enumeration", Document Ref. No. FT_000180, Version 1.0, Oct. 28, 2009, 19 pages.
(Continued)

*Primary Examiner* — Brian D Nguyen
(74) *Attorney, Agent, or Firm* — Fenwick & West LLP (57) ABSTRACT

An extremely high frequency (EHF) protocol converter may include a transducer, an EHF communication circuit, a protocol conversion circuit, and a circuit port. The transducer may be configured to convert between an electromagnetic EHF data signal and an electrical EHF signal. The EHF communication circuit may be configured to convert between a baseband data signal and the electrical EHF signal. The protocol conversion circuit may be adapted to convert between the baseband data signal having data formatted according to a first data protocol associated with a first external device and a second baseband data signal having data formatted according to a second data protocol associated with a second external device. The second data protocol may be different from the first data protocol. The circuit port may conduct the second baseband data signal to the second external device.

16 Claims, 7 Drawing Sheets

Related U.S. Application Data (60) Provisional application No. 61/824,293, filed on May 16, 2013.

(56) References Cited

U.S. PATENT DOCUMENTS

| | | |
|---|---|---|
| 6,252,767 B1 | 6/2001 | Carlson |
| 6,490,443 B1 | 12/2002 | Freeny, Jr. |
| 6,492,973 B1 | 12/2002 | Kuroki et al. |
| 6,647,246 B1 | 11/2003 | Lu |
| 6,915,529 B1 | 7/2005 | Suematsu et al. |
| 7,213,766 B2 | 5/2007 | Ryan et al. |
| 7,471,181 B1 | 12/2008 | MacLennan |
| 7,599,427 B2 | 10/2009 | Bik |
| 7,617,342 B2 | 11/2009 | Rofougaran |
| 7,664,461 B2 | 2/2010 | Rofougaran et al. |
| 7,769,347 B2 | 8/2010 | Louberg et al. |
| 7,929,474 B2 | 4/2011 | Pettus et al. |
| 8,131,645 B2 | 3/2012 | Lin et al. |
| 8,244,179 B2 | 8/2012 | Dua |
| 8,346,847 B2 | 1/2013 | Steakley |
| 8,714,459 B2 | 5/2014 | McCormack et al. |
| 2002/0106041 A1 | 8/2002 | Chang et al. |
| 2003/0174797 A1* | 9/2003 | Grushin .............. G06F 1/08 375/376 |
| 2005/0109841 A1 | 5/2005 | Ryan et al. |
| 2006/0082518 A1 | 4/2006 | Ram |
| 2006/0128372 A1 | 6/2006 | Gazzola |
| 2006/0258289 A1 | 11/2006 | Dua |
| 2007/0035917 A1 | 2/2007 | Hotelling et al. |
| 2007/0147425 A1 | 6/2007 | Lamoureux et al. |
| 2007/0171312 A1* | 7/2007 | Kishi .............. H03D 3/007 348/726 |
| 2007/0229270 A1 | 10/2007 | Rofougaran |
| 2008/0002652 A1 | 1/2008 | Gupta et al. |
| 2008/0055303 A1 | 3/2008 | Ikeda |
| 2008/0089667 A1 | 4/2008 | Grady et al. |
| 2008/0159243 A1 | 7/2008 | Rofougaran |
| 2008/0192726 A1 | 8/2008 | Mahesh et al. |
| 2008/0195788 A1 | 8/2008 | Tamir et al. |
| 2009/0006677 A1 | 1/2009 | Rofougaran |
| 2009/0009337 A1 | 1/2009 | Rofougaran |
| 2009/0037628 A1 | 2/2009 | Rofougaran |
| 2009/0094506 A1 | 4/2009 | Lakkis |
| 2009/0103704 A1 | 4/2009 | Kitada et al. |
| 2009/0207893 A1 | 8/2009 | Leutgeb et al. |
| 2009/0218701 A1 | 9/2009 | Rofougaran |
| 2009/0239392 A1 | 9/2009 | Sumitomo et al. |
| 2010/0159829 A1 | 6/2010 | McCormack |
| 2010/0167645 A1 | 7/2010 | Kawashimo |
| 2010/0203833 A1 | 8/2010 | Dorsey |
| 2010/0253256 A1* | 10/2010 | Doktar .............. H02M 1/36 318/400.11 |
| 2010/0265648 A1 | 10/2010 | Hirabayashi |
| 2010/0315954 A1 | 12/2010 | Singh et al. |
| 2011/0092212 A1 | 4/2011 | Kubota |
| 2011/0197237 A1 | 8/2011 | Turner |
| 2011/0286703 A1 | 11/2011 | Kishima et al. |
| 2011/0311231 A1 | 12/2011 | Ridgway et al. |
| 2012/0069772 A1 | 3/2012 | Byrne et al. |
| 2012/0072620 A1 | 3/2012 | Jeong et al. |
| 2012/0110635 A1 | 5/2012 | Harvey et al. |
| 2012/0263244 A1 | 10/2012 | Kyles et al. |
| 2012/0265596 A1 | 10/2012 | Mazed et al. |
| 2012/0286049 A1 | 11/2012 | McCormack et al. |
| 2012/0290760 A1 | 11/2012 | McCormack et al. |
| 2012/0295539 A1 | 11/2012 | McCormack et al. |
| 2012/0319890 A1 | 12/2012 | McCormack et al. |
| 2013/0103111 A1* | 4/2013 | Meskens .............. A61N 1/37217 607/57 |
| 2013/0187663 A1* | 7/2013 | Wang .............. G01R 31/28 324/537 |
| 2013/0210490 A1 | 8/2013 | Fischer et al. |
| 2013/0266026 A1* | 10/2013 | McCormack .......... G06F 13/00 370/474 |
| 2013/0266754 A1* | 10/2013 | Sturman .............. A41D 27/24 428/57 |
| 2013/0271331 A1 | 10/2013 | Redd |
| 2014/0024314 A1 | 1/2014 | McCormack et al. |

FOREIGN PATENT DOCUMENTS

| | | |
|---|---|---|
| EP | 0515187 | 11/1992 |
| EP | 1298809 | 4/2003 |
| EP | 2309608 | 4/2011 |
| JP | 2008252566 | 10/2008 |
| WO | WO 2012/154550 | 11/2012 |
| WO | WO 2012/155135 | 11/2012 |
| WO | WO 2013/006641 | 1/2013 |
| WO | WO 2013/040396 A1 | 3/2013 |
| WO | WO 2014/026191 | 2/2014 |

OTHER PUBLICATIONS

"WirelessHD Specification version 1.1 Overview", www.wirelesshd.org, May 2010, 95 pages.

ECMA International, "Standard ECMA—398: Close Proximity Electric Induction Wireless Communications", Internet citation, Jun. 1, 2011, pp. 1-99.

PCT International Search Report and Written Opinion, PCT Application No. PCT/US2014/038503, dated Sep. 19, 2014, 12 pages.

U.S. Office Action, U.S. Appl. No. 14/280,508, dated Nov. 5, 2015, 8 pages.

Chinese First Office Action, Chinese Application No. 201480027766.7, dated Dec. 19, 2016, 15 pages (with concise explanation of relevance).

\* cited by examiner

EXTREMELY HIGH FREQUENCY CONVERTER

CROSS-REFERENCES TO RELATED APPLICATIONS

The present application is a continuation of U.S. patent application Ser. No. 14/280,508, filed on May 16, 2014, entitled "Extremely High Frequency Converter," and issued as U.S. Pat. No. 9,407,731 on Aug. 2, 2016, which claims the benefit under 35 U.S.C. §119(e) of the filing date of U.S. Provisional Patent Application No. 61/824,293, filed on May 16, 2013, entitled "Modular Protocol Dongles," each of which is hereby incorporated by reference in its entirety.

TECHNICAL FIELD

The disclosure relates to protocol converters and combinable electronic devices. More particularly, the disclosure relates to extremely high frequency protocol converters and combinable devices.

BACKGROUND

Advances in semiconductor manufacturing and circuit design technologies have enabled the development and production of integrated circuits (ICs) with increasingly higher operational frequencies. In turn, electronic products and systems incorporating such integrated circuits are able to provide much greater functionality than previous generations of products. This additional functionality has generally included the processing of increasingly larger amounts of data at increasingly higher speeds.

The processing of increasingly large amount of data involves converting and communicating the data into different protocols which are acceptable to individual interconnected devices. For example, a remote device that communicates data in a first protocol having an associated connector design may access a host device that uses data in a second protocol having a different connector design. Moreover, with the abundance of different types of interconnected devices, the number of data protocols commonly used is increasing.

To overcome the above stated problem of different data protocols, protocol converters are used, generally in the form of cables having embedded chips that convert between the two protocols and provide a connector for each protocol on the ends of the cable for connecting to devices having the respective protocols.

BRIEF SUMMARY

In a first example, a first extremely high frequency (EHF) protocol converter may be provided. The first EHF protocol converter may include at least a first transducer, at least a first EHF communication circuit, a protocol conversion circuit and a circuit port. The first transducer may be configured to convert between a first electromagnetic EHF data signal and a first electrical EHF signal. The first EHF communication circuit may be configured to convert between a first baseband data signal and the first electrical EHF signal. The protocol conversion circuit may be adapted to convert between the first baseband data signal when the first baseband data signal has data formatted according to a first data protocol associated with a first external device and a second baseband data signal having data formatted according to a second data protocol. The second data protocol may be different from the first data protocol. The circuit port may be coupled to the protocol conversion circuit for conducting the second baseband data signal relative to a second external device which is configured to operate with the second baseband data signal.

In a second example, an EHF protocol converter assembly may be provided. The EHF protocol converter assembly may include a plurality of EHF protocol converters. Each of the EHF protocol converters may include at least one respective transducer, at least a first and a second dielectric channel portions with each dielectric channel portion electromagnetically coupled with one of the at least one respective transducer, an EHF communication circuit, a protocol conversion circuit and a circuit port. The protocol conversion circuit of each EHF protocol converter may be adapted to convert between a respective first baseband data signal having data formatted according to a first data protocol and a respective other baseband data signal having data formatted according to a respective other data protocol different than the first data protocol. Each EHF protocol converter may be mechanically attached to another one of the plurality of EHF protocol converters. A first external surface of one of the plurality of EHF protocol converters may be matingly received by a second external surface of another one of the plurality of EHF protocol converters.

In a third example, a first EHF device may be provided. The first EHF device may include at least a first transducer, at least a first EHF communication circuit, a first dielectric channel portion and a second dielectric channel portion. The first and second dielectric channel portions may be electromagnetically coupled with a transducer of the at least a first transducer. The first transducer may be configured to convert between a first electromagnetic EHF data signal and a first electrical EHF signal. The first EHF communication circuit may be configured to convert between a first baseband data signal and the first electrical EHF signal. The first dielectric channel portion may have a first end configured as a first electromagnetic signal port associated with a first external surface of the first EHF device for conveying the electromagnetic EHF data signal between the first dielectric channel portion and an external electromagnetic EHF channel when the external electromagnetic EHF channel is coupled with the first electromagnetic signal port. The second dielectric channel portion may have a second end configured as a second electromagnetic signal port associated with a first external surface of the first EHF device. The first external surface may be spaced from the second external surface and may have a first surface configuration. The second external surface may have a second surface configuration configured to matingly receive an external surface of a communication device having the first surface configuration.

In a fourth example, an EHF device assembly may include a plurality of EHF devices. Each of the EHF device may include at least one respective transducer, at least a first and a second dielectric channel portions, and an EHF communication circuit. The first and the second dielectric channel portions may be electromagnetically coupled with one of the at least one respective transducer. Each EHF device may be mechanically attached to another one of the plurality of EHF device. A first external surface of one of the plurality of EHF devices may be matingly received by a second external surface of another one of the plurality of EHF devices.

BRIEF DESCRIPTION OF THE DRAWINGS

Having thus described the invention in general terms, reference will now be made to the accompanying drawings, which are not necessarily drawn to scale, and wherein:

There may be additional structures described in the description that are not depicted in the drawings, and the absence of such a drawing should not be considered as an omission of such design from the specification.

DETAILED DESCRIPTION

Embodiments described herein may utilize apparatus components and steps related to electronic devices capable of EHF communication, including close-proximity EHF communication. Accordingly, the apparatus components have been represented where appropriate by conventional symbols in the drawings, showing specific details that are pertinent for an understanding of the present disclosure so as not to obscure the disclosure with details that will be readily apparent to those with ordinary skill in the art having the benefit of the description herein.

Detailed embodiments are disclosed herein; however, it is to be understood that the disclosed embodiments are merely exemplary of the claimed elements, which can be embodied in various forms. Therefore, specific structural and functional details disclosed herein are not to be interpreted as limiting, but merely as a basis for the claims and as a representative basis for teaching one skilled in the art to variously employ the disclosed concepts in an appropriate structure. Further, the terms and phrases used herein are not intended to be limiting but rather to provide an understandable description of the subject matter.

Furthermore, in today's society and computing environment, electronic devices are being used increasingly. Methods and apparatus using EHF communication may provide secure, stable, and high-bandwidth communication between and within these devices.

The embodiments described utilize EHF communication circuits, including close-proximity EHF communication circuits. Where EHF communication is used in the following description, it should be understood that phrase includes close-proximity EHF communication. Examples of such communication circuits are known, as are described in detail in U.S. Patent Application Publication Nos. 2012/0307932, 2012/0263244, 2012/0286049, and 2013/0070817, all of which are hereby incorporated in their entireties for all purposes. Communication may be used to provide signal communications between components or modules in a device or may provide communication between devices. Communication provides an interface that is not subject to mechanical and electrical degradation. Examples of systems employing communication between chips are disclosed in U.S. Pat. No. 5,621,913 and U.S. Published Patent Application No. 2010/0159829, the disclosures of which are incorporated herein by reference in their entirety for all purposes.

In one example, tightly-coupled transmitter/receiver pairs may be deployed with a transmitter disposed at a terminal or intermediate portion of a first conduction path and a receiver disposed at a terminal or intermediate portion of a second conduction path. The transmitter and receiver may be disposed in close proximity to each other depending on the strength of the transmitted energy, and the first conduction path and the second conduction path may be discontinuous with respect to each other.

A transmitter or receiver may be configured as an IC package, in which an antenna may be positioned adjacent to a die and held in place by a dielectric or insulating encapsulation or bond material. A transmitter or receiver may be configured as an IC package, in which an antenna may be positioned adjacent to a die and held in place by encapsulation material of the package and/or a lead frame substrate.

As is discussed further below, these communication circuits may be used to create separate electronic devices that can thus transfer data without contacts, each electronic device may be self-contained, and may be environment-proofed. Separate devices may be assembled and disassembled with ease, even by hand, as no complicated and/or easily-damaged connectors are used in assembly of a combination of the devices. The devices may be configured with magnets or clips to connect to each other in one or more configurations. In this fashion, different devices may be field-swapped as appropriate for a particular application. By using the EHF communication circuits to provide communication, relaxed device alignment requirements may be facilitated due to the relatively tolerant EHF coupling characteristics of the EHF communication link. Exposed metal for connectors on the devices may be eliminated as well, resulting in better wear characteristics and enabling capabilities such as waterproofing.

Figure 1:
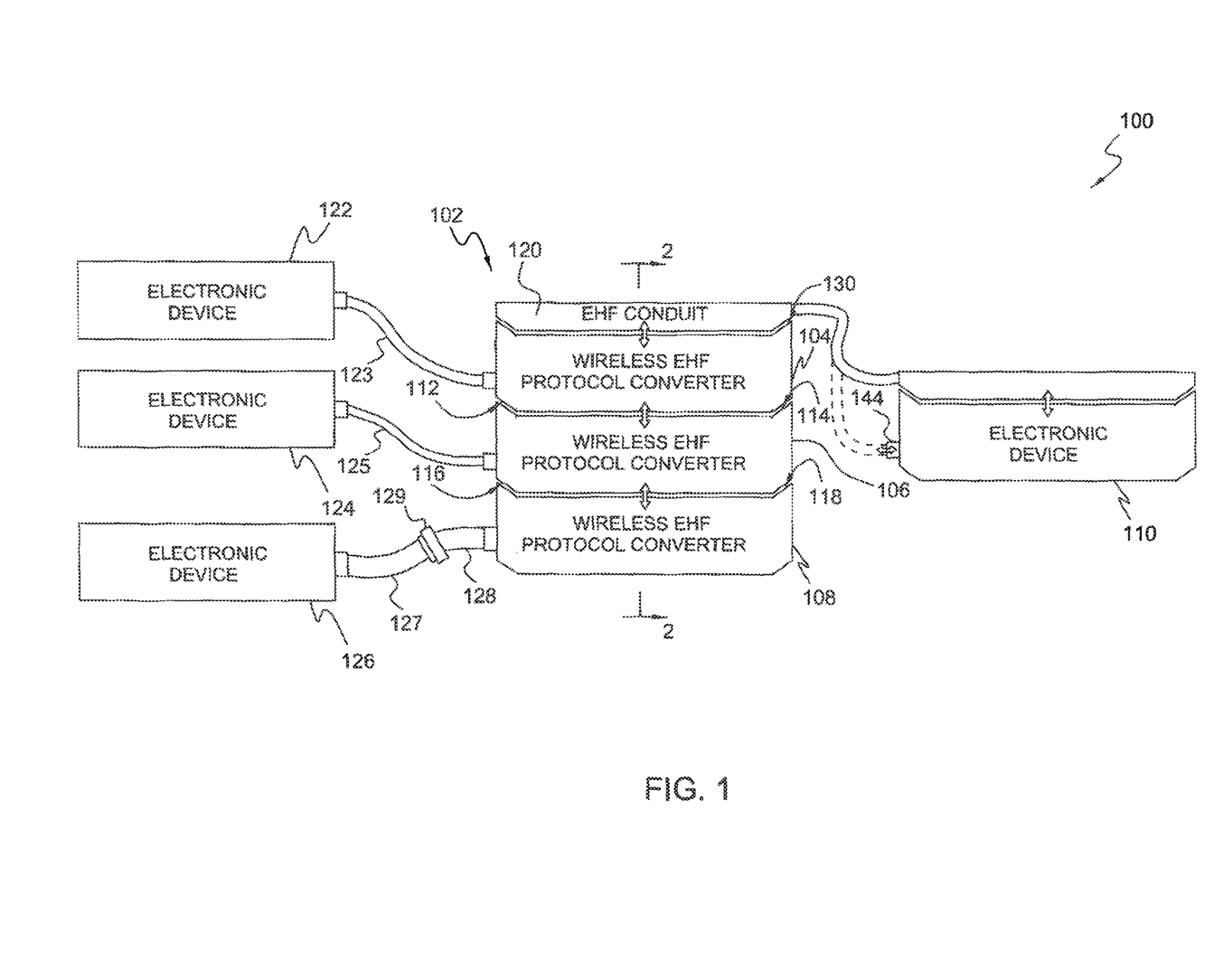
FIG. 1 illustrates a system for converting the formatting of data in a data signal from one data protocol to a different data protocol.

FIG. 1 illustrates simplistically a system 100 for converting standard or proprietary protocol accepted by a device to a protocol suitable for other devices or tools to achieve interoperability amongst the devices. The system 100 may include an EHF protocol converter assembly 102, also referred to as an example of an EHF device assembly. The EHF protocol converter assembly 102 may include one or a plurality of EHF protocol converters, such as an EHF protocol converter 104, an EHF protocol converter 106, and an EHF protocol converter 108. The EHF protocol converters as illustrated and described may also be referred to as EHF devices.

Each EHF protocol converter may include first and second spaced-apart external surfaces that are complementarily configured so that the first external surface of one EHF protocol converter is received matingly with the second external surface of another EHF protocol converter or other compatible device. The first and second surfaces may be disposed on different parts of the respective EHF devices. In the example shown, one of the surfaces is a bottom surface and the other is a top surface. For convenience, then, the terms "top" and "bottom" will be used to refer to these surfaces, it being understood that the surfaces may be in other relative positions and the orientation of the EHF devices forming an assembly may vary.

In the example shown, a lower external surface 112 of the EHF protocol converter 104 may be mechanically attached and matingly received by a top external surface 114 of the EHF protocol converter 106. Similarly, a bottom external surface 116 of the EHF protocol converter 106 may be mechanically attached and matingly received by a top external surface 118 of the EHF protocol converter 108.

In an embodiment, the EHF protocol converter assembly 102 may include an electromagnetic EHF conduit 120. EHF conduit 120 may conduct an electromagnetic EHF signal from an electronic device 110, using data formatted according to a specific protocol, to the one or more EHF protocol converters of assembly 102. Each EHF protocol converter may also be connected to a respective other electronic device. In this example, EHF protocol converter 104 is connected to an electronic device 122 by a connecting cable 123. Cable 123 may be permanently attached to EHF protocol converter 104 or it may connect using connections appropriate for the protocol of electronic device 122. Similarly, EHF protocol converter 106 may be connected to an electronic device 124 by a connecting cable 125 have connectors associated with the protocol of electronic device 124. Also, EHF protocol converter 108 may be connected to an electronic device 126 by a connecting cable 127 having conventional connectors on each end. In this example, EHF protocol converter 108 may include a cable 128 having a receptacle 129 at a distal end configured to receive a connector of cable 127. Each EHF protocol converter may convert a data signal from the protocol of signals received or sent to electronic device 110 and the protocols of electronic devices 122, 124, 126 that are different than the protocol of electronic device 110. The protocols of electronic devices 122, 124, 126 may be the same or some of the protocols may be different.

Figure 2:
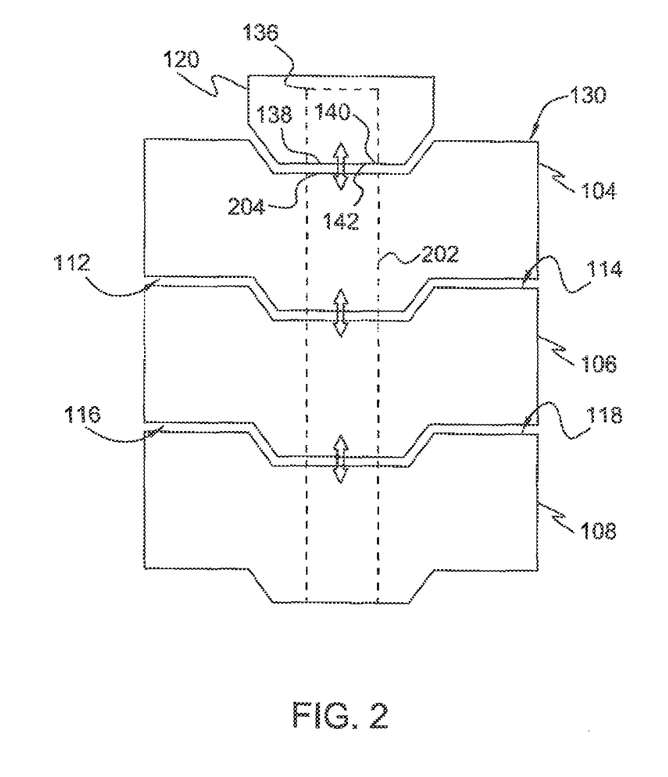
FIG. 2 is a simplified cross-sectional view of an EHF protocol converter assembly shown in FIG. 1 and taken along line 2-2 in FIG. 1.
Figure 3:
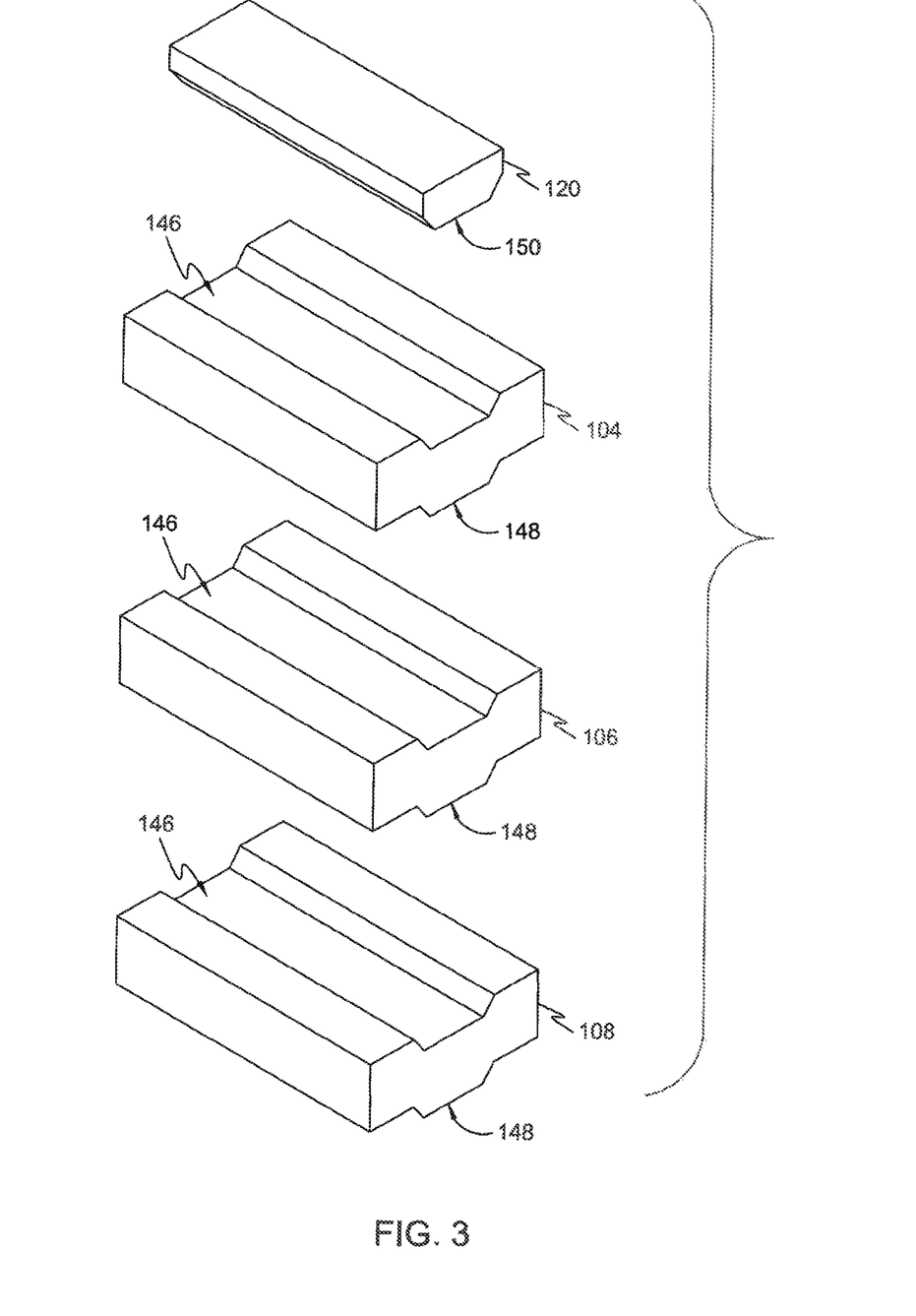
FIG. 3 is a simplified exploded view of the EHF protocol converter assembly shown in FIG. 1.
Figure 4:
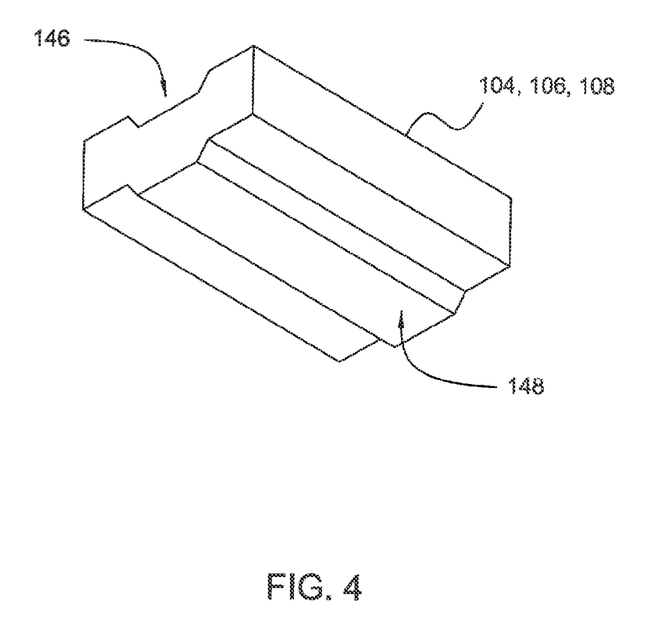
FIG. 4 is an isometric view showing a different view of an EHF protocol converter shown in FIG. 1.

FIG. 2 is a simplified cross sectional view of the EHF protocol converter assembly 102 taken along the line 2-2 in FIG. 1. A slight amount of space is shown between the devices forming the assembly. These surface may also be in physical contact. FIG. 3 is a simplified exploded view of the EHF protocol converter assembly showing the top surfaces of the EHF protocol converters, and FIG. 4 is an isometric view of EHF protocol converter 102 showing the bottom surface. EHF conduit 120 and the respective facing top and bottom surfaces of each of the EHF protocol converters 104, 106 and 108 may be mechanically interconnected, thereby providing alignment between dielectric channels (also shown by double-ended arrows in FIG. 1) and illustrated by dashed lines in FIG. 2. The electromagnetic EHF conduit 120 may provide at least a dielectric first conduit channel 136 configured to convey electromagnetic EHF signals between electronic device 110 and the assembly of EHF protocol converters.

In an embodiment, the first conduit channel of electromagnetic EHF conduit 120 may include a terminal end 138 configured as a first conduit signal port 140. The first conduit signal port 140 may be associated with a first conduit surface 142 of the electromagnetic EHF conduit 120 for conveying electromagnetic EHF signals between the first conduit channel 136 and a first channel or channel portion 202 of the first EHF protocol converter 104. The conduit surface 142 may partially have a surface configuration conforming at least in part to the configuration of bottom surfaces of the EHF protocol converters, such as bottom surfaces 112, 116, and may be matingly received, in this example, by the top external surface 130 of the EHF protocol converter 104. The conduit signal port 140 may be aligned sufficiently with an electromagnetic signal port 204 of the EHF protocol converter 104 to provide coupling between the ports. EHF conduit 120 may connect to electronic device 110 by a similar terminal end having corresponding surface configurations that mate with a correspondingly complementary surface of the electronic device, or by an appropriate connector 144.

In the embodiments shown, the top surfaces are configured with a groove or recess 146 and the bottom surfaces are configured with a ridge or protrusion 148 that can be matingly received in the complementary recess 146 of the top surface. Bottom surface 142 of EHF conduit 120 correspondingly has a protrusion 150 that at least partially conforms to protrusions 148 of the EHF protocol converters. It will be appreciated, then, that the bottom surface of any of EHF protocol converters 102, 104, 106, and the bottom surface of electromagnetic EHF conduit 108 may interchangeably be matingly received in any of the top surfaces of the EHF protocol converters. The EHF protocol converter assembly may thus be composed of a combination of one or more EHF protocol converters in any order.

This complementary physical configuration of ridges and grooves may be utilized to mechanically attach the EHF protocol converter 104 with the EHF protocol converter 106 and the EHF conduit 120. By utilizing this mechanical arrangement, a basic assembly of stacking the plurality of EHF protocol converters with the EHF conduit may be formed. Although stacking or layering of the EHF protocol converters is shown, it will be appreciated that other configurations of combining or assembling EHF protocol converters may be provided. It may be noted that different mechanical arrangements may be utilized to mechanically connect and align the multiple EHF protocol converters with one another and with the EHF conduit and may enable the conversion of data protocol. Other mechanical arrangements that enable mechanical alignment and interconnection may be utilized to form an EHF protocol converter assembly.

Further, a signal may be fed to the assembly by a electromagnetic EHF conduit 120. Alternatively or additionally, a EHF protocol converter may be configured to receive an electromagnetic EHF signal directly from an external device 110 such as through a correspondingly configured surface of the external device or via a dielectric conduit, in addition to functioning as a protocol converter for yet a different device. For example, a EHF protocol converter assembly could be positioned on the top surface of electronic device 110, eliminating the need for a separate communication link for the electromagnetic EHF signal as provided by EHF conduit 120.

In an embodiment, the electromagnetic EHF data signal may conduct progressively through the EHF protocol converter 104, the EHF protocol converter 106, and the EHF protocol converter 108, as represented by the double-ended arrows in FIGS. 1 and 2.

Figure 5:
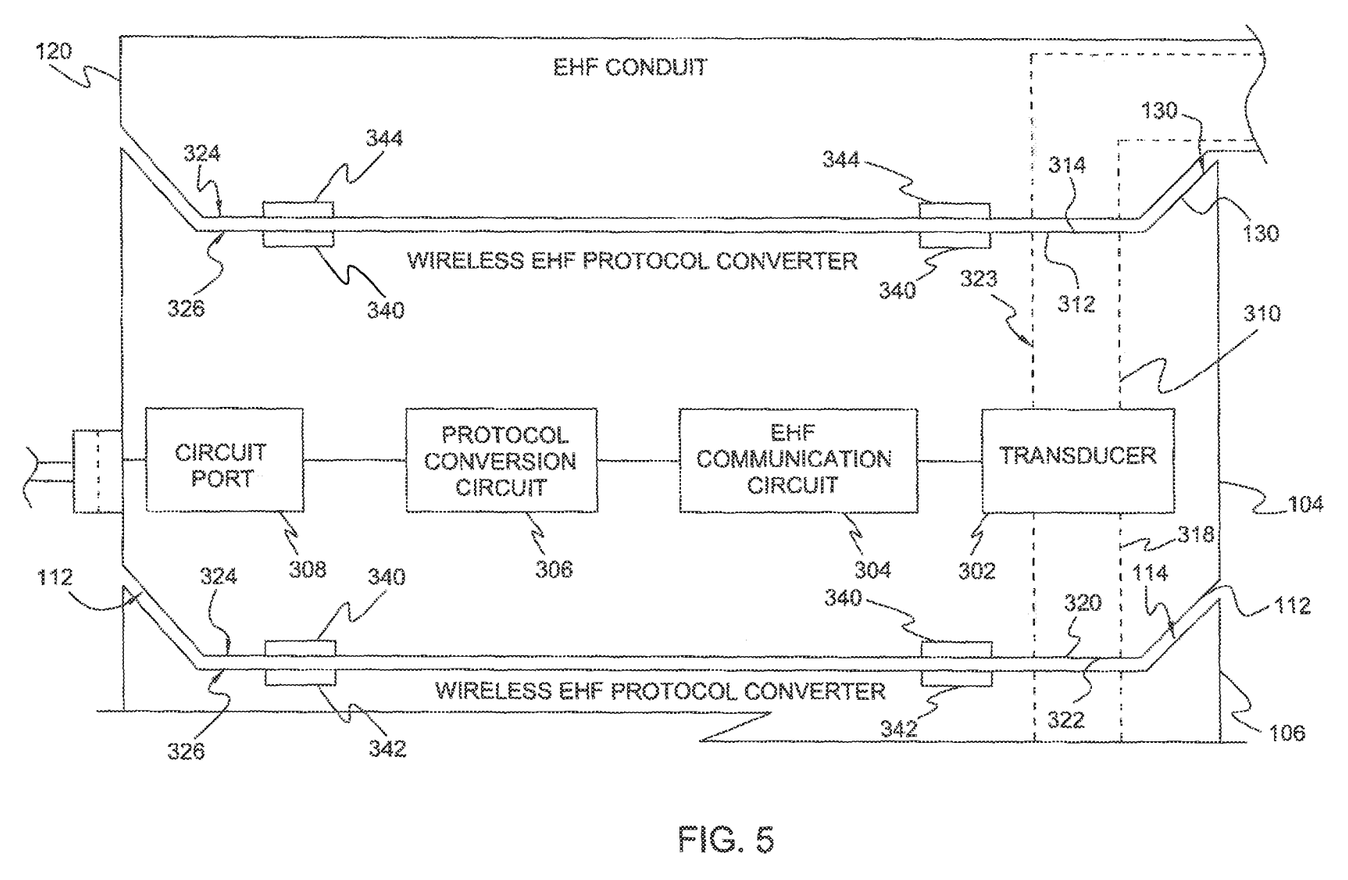
FIG. 5 illustrates an example of an EHF protocol converter of an EHF protocol converter assembly.

Referring now to FIG. 5, an embodiment of an EHF protocol converter 104 is shown in further detail in association with a single lane EHF conduit 120. EHF protocol converters may each include a transducer, an EHF communication circuit, and a protocol conversion circuit to convert the electromagnetic EHF data signal from one data protocol to another data protocol. For example, the EHF protocol converter 104 may include a transducer 302, which receives the electromagnetic EHF data signal.

In an embodiment, a first dielectric channel portion 310, referred to as dielectric channel portion 202 in FIG. 2, may be electromagnetically coupled with the transducer 302. The first dielectric channel portion 310 may have a first end 312 configured as a first electromagnetic signal port 314 associated with a top external surface 130 of the EHF protocol converter 104 for conveying the electromagnetic EHF data signal between the first dielectric channel portion 310 and an external electromagnetic EHF channel (providing electromagnetic EHF data signal from the electronic device 110 shown in FIG. 1) when the external electromagnetic EHF channel is coupled with the first electromagnetic signal port 314.

In an embodiment, a second dielectric channel portion 318 may have a second end 320 configured as a second electromagnetic signal port 322 associated with the bottom external surface 112 of the EHF protocol converter 104. The first and second dielectric channel portions 310 and 318 may be part of a dielectric channel 323 that may extend continuously through the EHF protocol converter 104 between dielectric channel portions 310 and 318. As discussed above, the bottom external surface 112 may be spaced from the upper external surface 130. The bottom external surface 112 may have a bottom surface configuration 324 corresponding to ridge 148 and the top external surface 114 of EHF protocol converter 106, like top external surface 130 of EHF protocol converter 104, may have a top surface configuration 326. The bottom surface configuration 324 may be configured to matingly receive the top external surface 114 of the EHF converter 106 having the top surface configuration 326.

Each of the EHF protocol converter 104, the EHF protocol converter 106, and the EHF protocol converter 108 may strip off a respective portion of an electromagnetic EHF data signal being conducted with coupled dielectric channel and may convert the respective portion of the electromagnetic EHF data signal to a baseband signal having a data protocol suitable for correspondingly respective connected peripheral electronic device 122, electronic device 124, and electronic device 126.

In an example for purposes of illustration, an electromagnetic EHF data signal transmitted by or received from electronic device 110, which may be a computer or other device having a processor, and fed to the EHF protocol converter assembly 102 via EHF conduit 120, may have a SATA or PCI Express (PCIe) protocol. The EHF protocol converter 104 may convert a corresponding portion of the electromagnetic EHF data signal to a USB protocol for sending the corresponding portion of the signal between the computer and a keyboard, mouse, external drive, or other computer accessory. The EHF protocol converter 106 may be connected to a monitor and may convert a corresponding portion of the electromagnetic EHF data signal to or from VGA, DVI-D, Display Port, or Thunderbolt protocols as required by the monitor. If the monitor is a TV, the protocol may be HDMI. The EHF protocol converter 106 may be connected to a LAN hub, such as a switch or router and may convert a corresponding portion of the electromagnetic EHF data signal to Ethernet protocol. Some devices also use a Firewire protocol.

In another embodiment, at least two of the EHF protocol converters may convert the electromagnetic EHF data signal in same protocols, such as to a keyboard and a computer mouse.

Transducer 302 may receive the electromagnetic EHF data signal and may convert the electromagnetic EHF data signal to an electrical EHF signal. Accordingly, an EHF communication circuit 304 may convert the electrical EHF signal to a baseband data signal. A protocol conversion circuit 306 may then convert the data format of the baseband data signal having a data formatted according to a data protocol associated with the electronic device 110 to a data format which may be acceptable to the electronic device 122. For example, the protocol conversion circuit 306 may be adapted to convert between a first baseband data signal when the first baseband data signal has data formatted according to a first data protocol associated with the electronic device 110 and a second baseband data signal having data formatted according to a second data protocol (acceptable to the electronic device 122) different than the first data protocol. Following this, a circuit port 308 coupled to the protocol conversion circuit 306 may conduct the second baseband data signal to the electronic device 122 configured to operate with the second baseband data signal.

Figure 6:
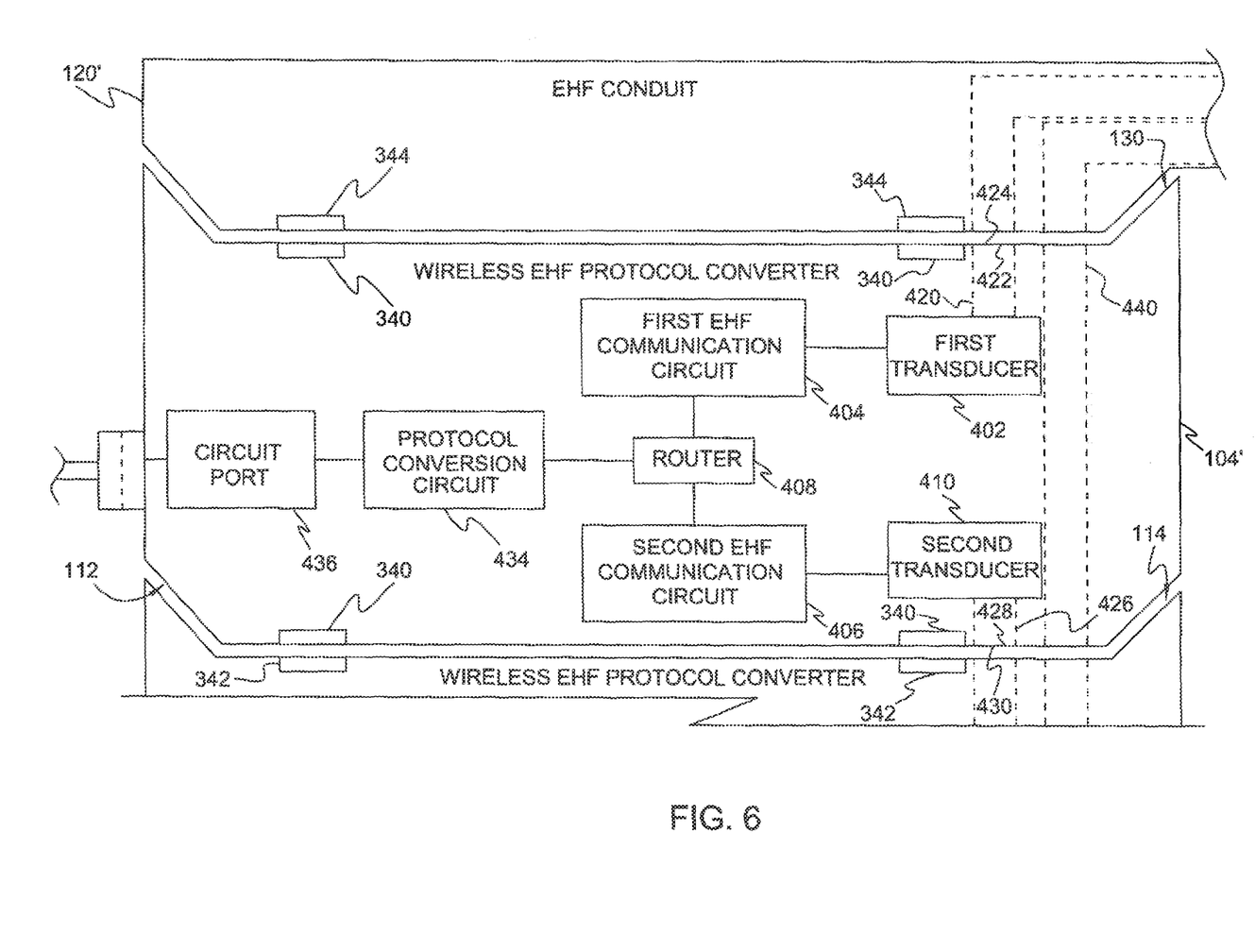
FIG. 6 illustrates a further example of a EHF protocol converter of a EHF protocol converter assembly.

In an embodiment and referring to FIGS. 5 and 6, magnets and/or a pair of magnets 340 on the EHF protocol converter 104 may enable mechanical connection and alignment with the EHF protocol converter 106 and the EHF conduit 120. That is, as shown, a pair of spaced magnets 340 may be disposed along top surface 130 and a pair of magnets 340 may be disposed along bottom surface 112 of EHF protocol converter 104. In addition, complementary magnets 342 are distributed on the top and bottom surfaces of EHF protocol converter 106, and magnets 344 may be distributed on the bottom surface of the EHF conduit 120. The facing magnets may have polarities selected to cause the magnets them to be attracted together when the respective top and bottom surfaces of mating devices are aligned. It will be appreciated that a combination of magnet and ferrous element may also provide sufficient attraction to enable the mechanical interconnection and alignment of the paired devices. Other devices may also be used to support the paired devices in a relative configuration that aligns the respective dielectric channels.

FIG. 6 illustrates another embodiment of an EHF protocol converter. In this example, there may be multiple lanes or dielectric channels of EHF signals in the EHF conduit 120. Each lane may be associated with a different data protocol of associated baseband data signals. As explained above, baseband signals obtained from the EHF signals conducting through these different lanes may be converted into different data protocols by different EHF protocol converters. A first dielectric channel portion 420 of an EHF protocol converter 104' may be electromagnetically coupled with a first transducer 402. The first dielectric channel portion 420 may have a first end 422 configured as a first electromagnetic signal port 424 associated with a second external surface 130 of the EHF protocol converter 104' for conveying the electromagnetic EHF data signal between the first dielectric channel portion 420 and the corresponding external electromagnetic EHF channel in an EHF conduit 120'.

In an embodiment, a second dielectric channel portion 426 may be electromagnetically coupled with a second transducer 410. The second dielectric channel portion 426 may have a first end 428 configured as a second electromagnetic signal port 430 associated with a first external surface 112 of the EHF protocol converter 104.

The first transducer 402 may be electromagnetically coupled with the first dielectric channel portion 420 and may be configured to convert between a first electromagnetic EHF signal and a first electrical EHF signal. Similarly, the second transducer 410 may be electromagnetically coupled with the second dielectric channel portion 426 and may be configured to convert between a second electromagnetic EHF signal and a second electrical EHF signal. A first EHF communication circuit 404 may convert between a first baseband data signal and the first electrical EHF signal. Similarly, a second EHF communication circuit 406 may be configured to convert between the first baseband data signal and the second electrical EHF signal. A signal router circuit 408 may be operatively coupled to the first and second EHF communication circuits 404 and 406 and a protocol conversion circuit 434 for routing the first baseband data signal between the first and second EHF communication circuits 404 and 406 and the protocol conversion circuit 434 for converting the protocol of the associated data signals as has been described. Following this, a circuit port 436 coupled to the protocol conversion circuit 434 may conduct the baseband data signal to the electronic device 122 configured to operate with the baseband data signal having the corresponding protocol.

In another embodiment, router 408 may also or alternatively direct a portion of the baseband signal received from one of the first and second EHF communication circuits to the other of the first and second EHF communication circuits for conveying the signal to other components in the EHF protocol converter assembly without converting the protocol.

In yet another embodiment, the EHF protocol converter 104' may conduct the EHF signal through a continuous dielectric channel 440. The subsequent EHF protocol converter (for example, the EHF protocol converter 106) may have a transducer that extends into a corresponding dielectric channel that is aligned sufficiently to couple an electromagnetic EHF signal from dielectric channel 440, as shown in FIG. 3, or relay it using one or more transducers explained above. Each EHF protocol converter thus may be configured to have a single dielectric channel, separate dielectric channels, a continuous dielectric channel, or a plurality of continuous and/or discontinuous channels and channel portions.

Figure 7:
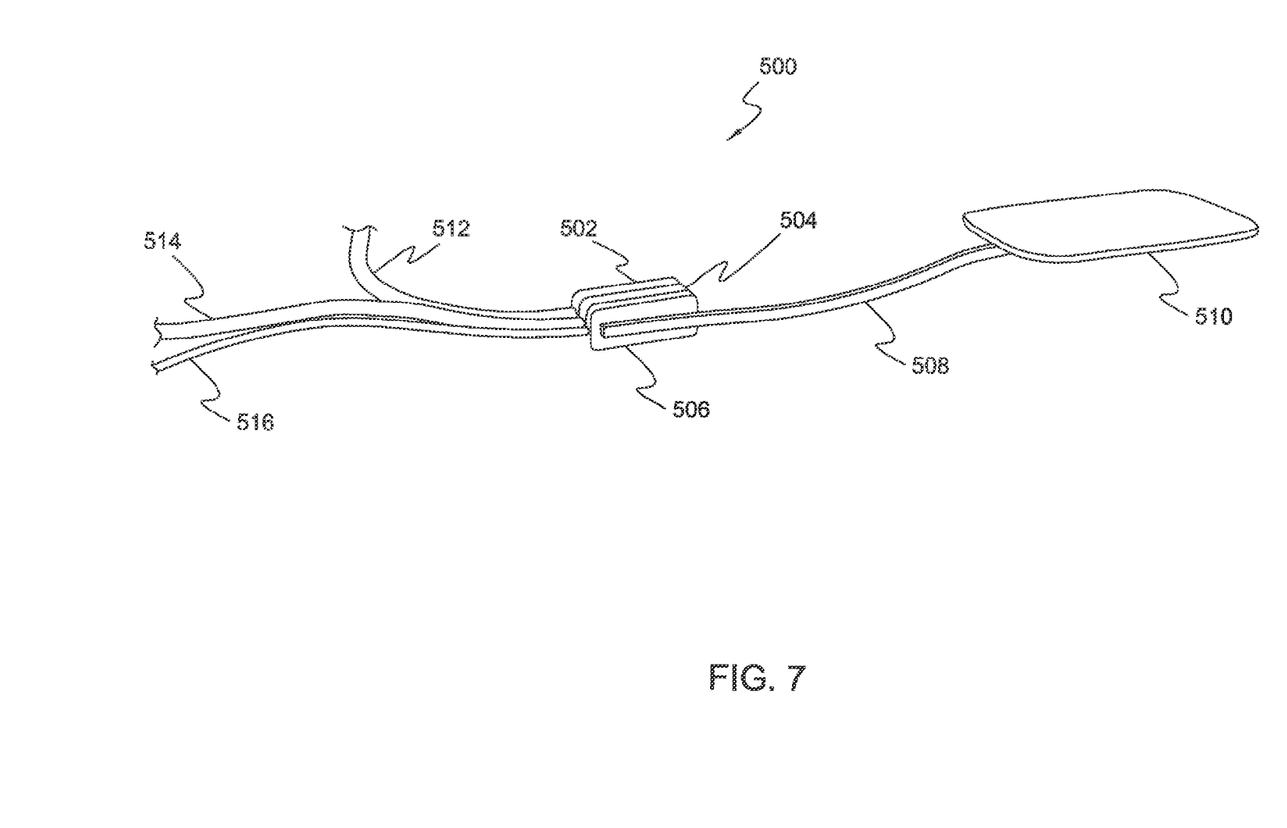
FIG. 7 illustrates yet another example of an EHF protocol converter assembly connected to a representative host device.

FIG. 7 illustrates how an EHF protocol converter assembly 500 may appear when configured for consumer use. Similar to the description above relating to the EHF protocol converter assembly 102, EHF protocol converter assembly 500 may include a plurality of EHF protocol converters, such as EHF protocol converters 502, 504, 506 stacked together. One EHF protocol converter, in this example, EHF protocol converter 506 receives a terminal end of an EHF conduit 508 that conveys an electromagnetic EHF signal from a host electronic device 510, such as an electronic tablet or smartphone. The EHF protocol converter assembly then converts the protocol of the host electronic device as appropriate and distributes the protocol-converted data signals to respective electronic devices, not shown, via respective connecting cables 512, 514, 516.

It will therefore be appreciated that EHF protocol converters and EHF protocol converter assemblies as described may provide essentially a modular design in which different protocol conversions may be provided. Such a configuration may provide flexibility in how the assembly is configured, may provide reliable contactless interfaces between mechanically interconnected assembly components, and is readily upgradable to changing protocols by the production of new EHF protocol converters rather than the entire assembly.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second, or third, for identified elements are used to distinguish between the elements, and do not indicate a required or limited number of such elements, and do not indicate a particular position or order of such elements unless otherwise specifically stated.

What is claimed is:

1. A system comprising:
   a dielectric channel configured to receive an extremely high frequency (EHF) electromagnetic signal;
   a first EHF protocol converter comprising a first portion of the dielectric channel, the first portion of the dielectric channel comprising a first electromagnetic signal port located on a first external surface of the first EHF protocol converter and a second electromagnetic signal port located on a second external surface of the first EHF protocol converter, the first EHF protocol converter coupled to receive a first portion of the received EHF electromagnetic signal from the first portion of the dielectric channel; and
   a second EHF protocol converter comprising a second portion of the dielectric channel, the second portion of the dielectric channel comprising a third electromagnetic signal port located on a first external surface of the second EHF protocol converter, the first external surface of the second EHF protocol converter mechanically and matingly received by the second external surface of the first EHF protocol converter, the second EHF protocol converter coupled to receive a second portion of the received EHF electromagnetic signal from the second portion of the dielectric channel.

2. The system of claim 1, wherein the first EHF protocol converter comprises:
   at least a first transducer coupled to receive the first portion the EHF electromagnetic signal from the first signal port and generate a first electrical EHF signal;
   at least a first EHF communication circuit configured to convert the first electrical EHF signal into a first baseband data signal; and
   a first protocol conversion circuit configured to convert the first baseband data signal into a second baseband data signal, the first baseband signal have a first protocol and the second baseband signal having a second protocol.

3. The system of claim 2, wherein the first protocol is the same as the second protocol.

4. The system of claim 1, wherein the first portion of the dielectric channels extends continually between the first signal port and the second signal port.

5. The system of claim 1, wherein the first EHF protocol converter includes a first pair of spaced apart magnets disposed on the second external surface of the first EHF protocol converter, and the second EHF protocol converter includes a second pair of spaced apart magnets disposed on the first external surface of the second EHF protocol converter, the first and second pairs of magnets having polarities that cause the first and second pairs of magnets to be attracted together when the second external surface of the first EHF protocol converter and the first external surface of the second EHF protocol converter are aligned.

6. The system of claim 1, wherein the second EHF protocol converter comprises:
   at least a second transducer coupled to receive the second portion of the EHF electromagnetic signal from the third signal port and generate a second electrical EHF signal;

at least a second EHF communication circuit configured to convert the second electrical EHF signal into a third baseband data signal; and a second protocol conversion circuit configured to convert the third baseband data signal into a fourth baseband data signal, the third baseband data signal having a third protocol and the fourth baseband data signal having a fourth protocol.

7. The system of claim 6, wherein the third protocol is the same as the fourth protocol.

8. The system of claim 1, wherein the second portion of the dielectric channels extends continually between the third signal port and a second external surface of the second EHF protocol converter.

9. The system of claim 1, further comprising an EHF conduit including a conduit channel, the conduit channel comprising a first end disposed on a first external surface of the EHF conduit and second end disposed on a second external surface of the EHF conduit, the first end coupled to receive the EHF electromagnetic signal from an external source and the second end positioned to be aligned with the first signal port of the first protocol converter.

10. A system comprising:
a first dielectric channel configured to receive a first extremely high frequency (EHF) electromagnetic signal;
a second dielectric channel configured to receive a second EHF electromagnetic signal; and
an EHF protocol converter comprising a portion of the first dielectric channel and a portion of the second dielectric channel, the portion of the first dielectric channel comprising a first electromagnetic signal port located on a first external surface of the EHF protocol converter, the portion of the second dielectric channel extending from the first external surface of the EHF protocol converter to a second external surface of the EHF protocol converter.

11. The system of claim 10, further comprising:
a first transducer electromagnetically coupled to the portion of the first dielectric channel to receive the first EHF electromagnetic signal, and configured to generate a first electrical EHF signal; and
a first EHF communication circuit configured to convert the first electrical EHF signal into a first baseband data signal.

12. The system of claim 11, further comprising:
a second transducer electromagnetically coupled to the portion of the second dielectric channel and configured to generate a second electrical EHF signal;
a second EHF communication circuit configured to convert second electrical EHF signal into a second baseband signal; and
a signal router circuit operatively coupled to receive the first and second baseband signals, and configured to selectively route the first baseband data signal or the second baseband signal to a protocol converter circuit.

13. The system of claim 11, wherein the first EHF electromagnetic signal has a first protocol and the second EHF electromagnetic signal has a second protocol.

14. The system of claim 13, wherein the first protocol is the same as the second protocol.

15. The system of claim 14, wherein the protocol converter circuit is configured to convert the first baseband data signal into a third baseband data signal having a third protocol.

16. The system of claim 14, wherein the protocol converter circuit is configured to convert the second baseband data signal into a fourth baseband data signal having a fourth protocol.

* * * * *

UNITED STATES PATENT AND TRADEMARK OFFICE
CERTIFICATE OF CORRECTION

PATENT NO. : 9,832,288 B2  
APPLICATION NO. : 15/225814  
DATED : November 28, 2017  
INVENTOR(S) : Gary D. McCormack, Roger Isaac and Eric Almgren Page 1 of 1

It is certified that error appears in the above-identified patent and that said Letters Patent is hereby corrected as shown below:

In the Claims

- Column 10, Line 36, Claim 2 insert --of-- after "portion" and before "the EHF electromagnetic signal".
- Column 10, Line 43, Claim 2 change "have" to --having--.
- Column 12, Line 17, Claim 12 insert --the-- before "second electrical EHF signal".

Signed and Sealed this  
Eighth Day of May, 2018

Andrei Iancu  
*Director of the United States Patent and Trademark Office*